US 6,619,612 B2

(12) United States Patent
Freisinger et al.

(10) Patent No.: US 6,619,612 B2
(45) Date of Patent: *Sep. 16, 2003

(54) EXTENDED RANGE PROPORTIONAL VALVE

(75) Inventors: Paul W. Freisinger, Stockholm, NJ (US); John J. Haller, Boonton, NJ (US); Peter A. Holborow, Califon, NJ (US)

(73) Assignee: Asco Controls, LP, Florham Park, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/506,967

(22) Filed: Feb. 18, 2000

(65) Prior Publication Data

US 2002/0053652 A1 May 9, 2002

Related U.S. Application Data

(60) Provisional application No. 60/120,673, filed on Feb. 19, 1999.

(51) Int. Cl.[7] .............................................. F16K 31/12
(52) U.S. Cl. ................ 251/30.03; 251/122; 251/129.17
(58) Field of Search .......................... 251/30.02, 30.03, 251/30.04, 129.08, 122, 129.17

(56) References Cited

U.S. PATENT DOCUMENTS

| | | | |
|---|---|---|---|
| 3,872,878 A | | 3/1975 | Kozel et al. ................ 137/242 |
| 3,994,318 A | * | 11/1976 | Ishigaki ............... 251/30.03 X |
| 4,248,270 A | | 2/1981 | Ostrowski .................... 138/45 |
| 4,342,443 A | * | 8/1982 | Wakeman ............... 251/129.08 |
| 4,505,450 A | * | 3/1985 | Saarem et al. ....... 251/30.01 X |
| 4,898,200 A | * | 2/1990 | Odajima et al. ..... 137/487.5 X |
| 5,035,119 A | | 7/1991 | Alsenz ......................... 62/225 |
| 5,599,003 A | * | 2/1997 | Seemann et al. ........ 251/30.03 |
| 5,676,342 A | * | 10/1997 | Otto et al. ........... 251/30.02 X |
| 5,716,038 A | * | 2/1998 | Scarffe .................... 251/30.03 |

FOREIGN PATENT DOCUMENTS

| | | | |
|---|---|---|---|
| EP | 0251479 | 1/1988 | ............. F16H/5/48 |
| EP | 0360569 | 3/1990 | ............. G05D/7/06 |
| EP | 0628742 | 12/1994 | ........... F16D/25/14 |
| WO | WO 9001651 | 2/1990 | ........... F16K/31/06 |

OTHER PUBLICATIONS

Supplementary European Search Report for EP 01953025, dated Mar. 24, 2003, 4–pages.
Pending claims 1–5 in application EP 01953024, dated Aug. 10, 2002, 4–pages.

* cited by examiner

*Primary Examiner*—Ehud Gartenberg
*Assistant Examiner*—Eric Keasel
(74) *Attorney, Agent, or Firm*—Howrey Simon Arnold & White LLP

(57) ABSTRACT

An extended range proportional valve which can control rates of mass flow over continuous low, intermediate and high ranges has a pilot member mounted on an armature of a solenoid which can be dithered onto and off of a pilot opening in a main valve member which seals a main valve opening to control mass flow rates over the low range by varying the duty cycle and/or frequency of a pulse width modulated current in the solenoid coil. Intermediate and high flow rates are achieved by dithering the pilot valve member with a duty cycle and/or frequency sufficient to raise the main valve member relatively short and relatively long respective distances from the main valve seat.

14 Claims, 6 Drawing Sheets

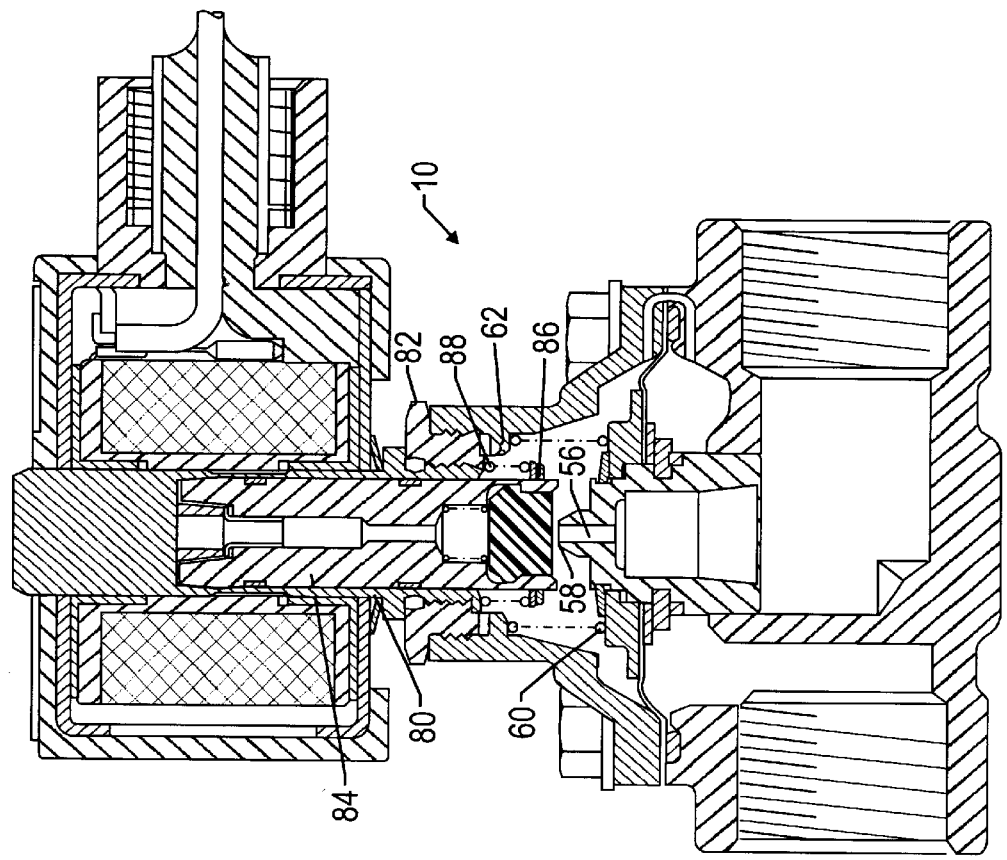
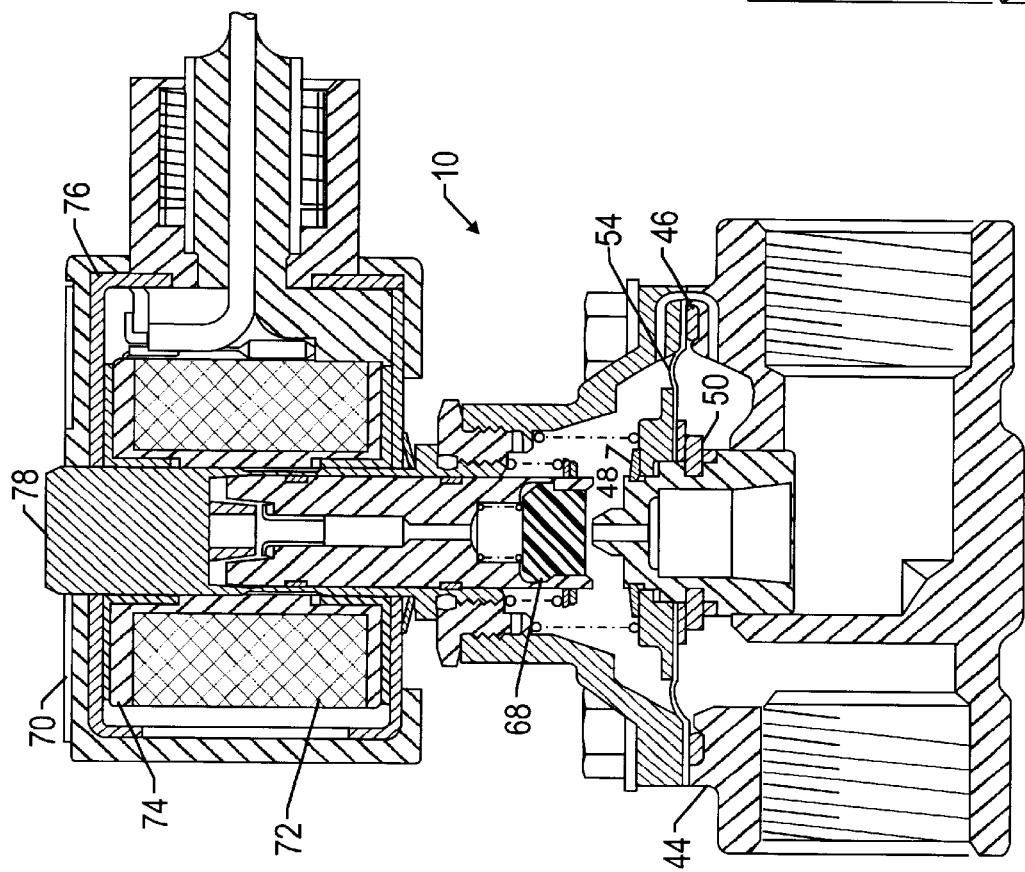

EXTENDED RANGE PROPORTIONAL VALVE

CROSS REFERENCE TO RELATED APPLICATIONS

This Application claims priority to Provisional Application Ser. No. 60/120,673 entitled "Extended Range Proportional Valve", filed Feb. 19, 1999 naming the above-named inventors.

BACKGROUND OF THE INVENTION

This invention relates to a valve of the proportional flow type operated by an electrical solenoid. More particularly, this invention relates to a valve having a high turn down ratio, i.e., one which can control flow rates ranging from very low, through intermediate, to very high magnitudes.

Proportional flow valves find utility in performing mixing and measurement functions. For example, proportional flow valves are used to accurately blend gasolines to achieve desired characteristics, such as particular octane ratings, to mix hot and cold water to obtain a desired temperature, and to dispense compressible and incompressible fluids, including liquids such as gasoline, and gases such as air and natural gas. Depending on the application for which a proportional flow valve is to be used, it may be necessary to maintain constant flow rates of a very low magnitude as well as constant flow rates of a very high magnitude, and constant flow rates of an intermediate magnitude between said high an low magnitudes.

In some prior art proportional valves, a main valve member is lifted off of and lowered onto a main valve seat to open and close the valve. The main valve member can be mounted at the center of a diaphragm. Such a valve is shown in U.S. Pat. No. 5,676,342. This valve permits a rate of fluid flow through the valve proportional to the amount of electric current flowing through the coil of the solenoid actuator controlling the valve. In this type of arrangement, the actuator behaves in a linear manner, i.e., the force produced by the solenoid armature is linearly proportional to the current applied to the solenoid. As a result, the solenoid armature works in a linear manner against a closing spring, which constantly urges the valve member toward the valve seat. In this way, the distance which the valve member is moved away from the valve seat is proportional to the amount of current applied to the solenoid.

Atop the main valve member is a pilot valve seat, which surrounds a pilot opening through the center of the main valve member. The plunger of a solenoid above the main valve member carries a pilot valve member which is lowered to seal the pilot valve opening in the main valve member and raised to open the pilot valve opening in the main valve member.

There is also a bleed opening in the housing or diaphragm, or through another channel, through which fluid can flow between a reservoir chamber above the diaphragm and an inlet chamber below the diaphragm. This bleed opening is smaller than the pilot opening. When the pilot opening is sealed by the plunger, fluid from the inlet port enters the inlet chamber below the diaphragm and passes through the bleed opening in the diaphragm to the reservoir above the diaphragm. The fluid above the diaphragm urges the diaphragm downwardly toward the main valve seat thereby sealing a main valve opening surrounded by the main valve seat, and closing the valve. When the solenoid is actuated to lift the plunger off of the pilot opening, fluid above the diaphragm is drained through the pilot opening faster than it can enter through the smaller bleed opening thereby lessening the pressure above the diaphragm and causing fluid pressure from the inlet below the diaphragm to force the diaphragm upward thereby lifting the main valve member off of the main valve seat for opening the valve.

The valve of the above mentioned U.S. Pat. No. 5,676,342 has been found to admirably perform its function. However when very low flow rates are to be maintained, the plunger is moved to a position which enables the diaphragm to lift the main valve member just slightly off of the main valve opening. At this time, the pressure differential between the areas above and below the diaphragm is so great that the main valve member tends to jump when lifted off of the main valve seat thereby preventing attainment of very low flow rates. This occurrence denotes the bottom end of the flow vs. current characteristic. That is, in a valve where flow rate is uniformly diminished by decreasing the current applied to the solenoid coil, flow is abruptly shut off when the solenoid coil current is reduced to a level where the main valve member is forced onto the main valve seat.

Conversely, while the main valve member is in engagement with the main valve seat and the current induced in the coil of a proportional solenoid valve is gradually increased, a level is reached where the main valve member jumps off of the main valve seat to a position where the lowest possible flow rate for that valve is achieved. Although this minimum flow rate can be optimized through careful selection of design parameters for the valve's components, it can not be improved sufficiently in cases where precise low flow rates are required.

It is also known in the art to operate a solenoid valve at a constant high flow rate by applying to the valve solenoid a full wave AC current for displacing the main valve member from the main valve seat, and at a constant low flow rate by rectifying the AC current to obtain a half-wave AC signal which, when applied to the solenoid coil, enables fluid to pass through the pilot opening but does not provide sufficient lifting force to enable the main valve member to be lifted off of the main valve seat. Such a valve is the subject of U.S. Pat. No. 4,503,887 to Johnson et al.

It is further known in the art to vary the degree of displacement of a pilot valve member from a pilot valve seat in a proportional valve by applying power to the valve's solenoid coil in the form of a periodically pulsed DC current, the amount of current varying. with the length of "on" and "off" times of the pulses, sometimes referred to as pulse width-modulation. Pulse width modulation for this purpose is disclosed in U.S. Pat. No. 5,294,089 to LaMarca and U.S. Pat. No. 5,676,342 to Otto et al.

None of the foregoing approaches has provided a solution to the problem of making a proportional solenoid valve with a high turn-down ratio, i.e., one which enables continuous variation of flow rate from very high and intermediate levels during which the main valve member is displaced from the main valve seat, to low levels during which the main valve member remains seated for sealing the main valve opening, and fluid flow is limited to passage through the pilot opening.

SUMMARY OF THE INVENTION

According to the invention, low flow rates are achieved over a continuous range, without lifting the main valve member off of the main valve seat, through pulse width and or frequency modulation of the current applied to the coil of a proportional solenoid valve. For low flow rates, e.g., gas flowing at a rate of 0.5 standard cubic feet per minute (scfm)

to 5.0 scfm, the solenoid armature or plunger is oscillated or dithered onto and off of the pilot valve seat on the main valve member with a duty cycle during which the pilot opening is exposed to inlet fluid under pressure for a portion of the cycle, and the pilot opening is closed for the balance of the cycle thereby maintaining the main valve member on the main valve seat and limiting fluid flow to a path through the pilot opening. For increasingly greater flow rates, the duty cycle of the solenoid armature is adjusted to increase the proportion of the cycle during which the pilot opening is exposed to the fluid, and thereby increase the rate of fluid flow through the pilot opening.

As the rate of fluid flow approaches a level that can allow control of the displacement of the main valve member from the main valve seat without the problem of jumping which is encountered at lower flow rates, the duty cycle of the solenoid current is further adjusted to enable the pilot valve to remain open long enough to raise the main valve member from the main valve seat a distance corresponding to a desired intermediate rate of flow where the rate of flow through the pilot opening is supplemented by limited flow through the main valve opening. Flow at intermediate mass flow rates is permitted as the main valve member is lifted to a position a short distance from the main valve seat. Higher flow rates, to which the contribution of flow through the pilot opening becomes insignificant, are achieved as the main valve member is lifted further away from the main valve seat.

It is therefore an object of the invention to provide a single proportional flow valve, which can provide continuous variation of flow rates over a range heretofore unrealizable.

Another object of the invention is to provide a proportional flow valve with a solenoid actuator which can be energized by a current having a variable duty cycle for dithering a pilot valve member onto and off of a pilot seat on a main valve member for enabling a continuous range of low flow rates through a pilot opening in the valve without raising the main valve member from the main valve seat.

Still another object of this invention is to provide apparatus for modulating flow through the pilot opening in the seated main valve member without reaching the critical flow rate at which open the main valve member is lifted of off the main valve seat.

A further object of the invention is to provide a valve of the type described above wherein the duty cycle and/or frequency of the pulse width modulated solenoid current can be adjusted to enable the pilot valve to remain open long enough to raise the main valve member from the main valve seat in degrees corresponding to a desired rate of intermediate or high volume fluid flow.

Still another object of the invention is to maintain continuity between low flow, intermediate flow, and high flow rates in a proportional solenoid valve as a transition takes place from a range of low flow rates only through the pilot opening (main valve closed) through intermediate flow rates having significant components passing through both the pilot and main valve openings, to high flow rates which occur principally through the main valve opening.

Other and further objects of the invention will be apparent from the following drawings and description of a preferred embodiment of the invention in which like reference numerals are used to indicate like parts in the various views.

DESCRIPTION OF THE DRAWINGS

FIG. 3 is a view similar to FIG. 1, but showing the valve while permitting an intermediate range of mass flow rates.

FIG. 4 is a view similar to FIG. 1 but showing the valve while permitting a high range of mass flow rates.

DESCRIPTION OF THE PREFERRED EMBODIMENT

Figure 1:
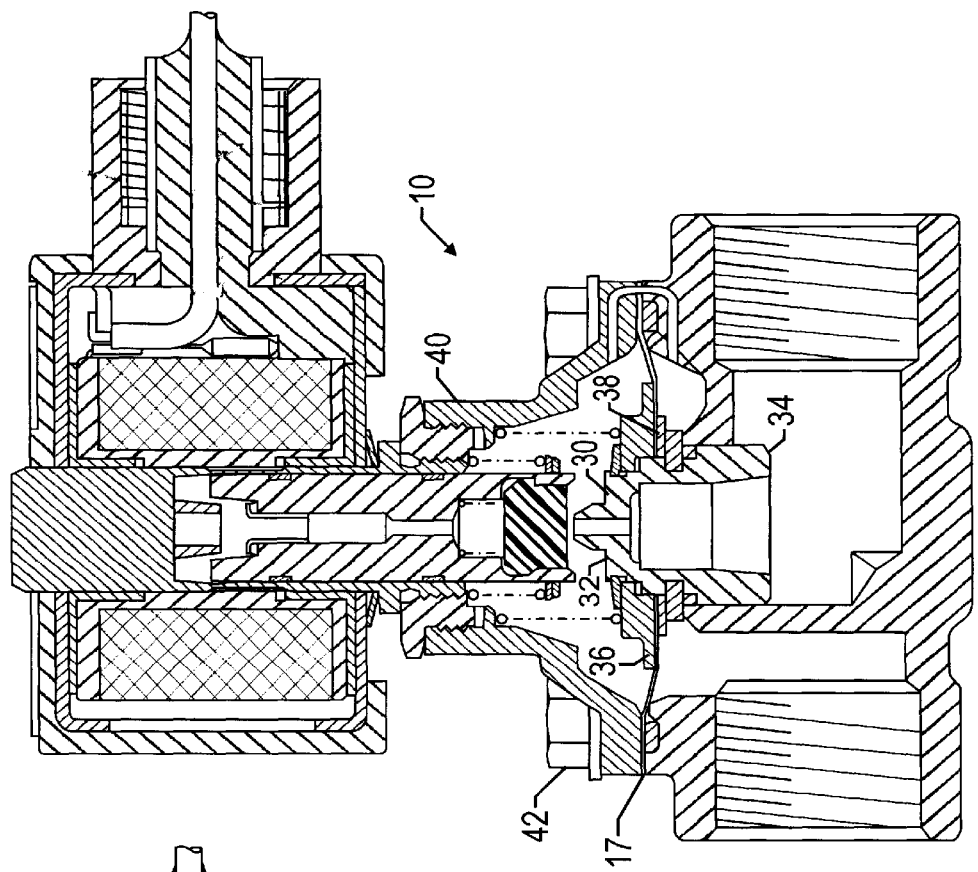
FIG. 1 is a cross sectional view of a proportional flow valve in accordance with the preferred embodiment of the invention, the solenoid actuator being de-energized and the valve closed.

Referring to FIGS. 1–4 of the drawings, a proportional flow valve 10 chosen to illustrate the present invention includes a valve body 12 having a fluid inlet port 14, a fluid outlet port 16, and main valve seat 18 surrounding a main orifice 20. The outlet port 16 resides within a hollow elbow having a right angular bend 24 which joins a horizontal section 22 and a vertical section 28, the latter terminating at the main valve seat 18.

A main valve unit 30 includes a main valve member 32, slidably mounted within vertical section 28 of outlet port 16 for reciprocal axial movement. The main valve member 32 has a generally circular cross section and axially extending circumferentially spaced parallel vanes 34, two of which can be seen in the drawings. The outer circumference of the main valve member 32 is profiled to accept an upper diaphragm support washer 36 having a planar lower annular surface and a diaphragm retaining ring 38 having a planar upper annular surface. Sandwiched between the lower annular surface of upper diaphragm support washer 36 and upper annular surface of diaphragm retaining ring 38 for movement with the main valve member 32 is the central area of an annular flexible diaphragm 17 which serves as a pressure member for the valve 10.

A bonnet plate 40 is secured to the top of the valve body 12 by suitable fasteners 42. Disposed between the bonnet plate 40 and a raised circumferential ridge 44 on the top of the valve body 12 is the outer circumference of diaphragm 17 which is fixedly held on its top side by the bonnet plate 40, and on its bottom side by the raised circumferential ridge 44 of the valve body 12 and a seal 46 inside and concentric with the ridge 44. Seal 46 cushions the underside of the diaphragm 17 and prevents leakage of fluid at the interfaces between the bonnet plate 40, valve body, 12, and diaphragm 17.

An annular retaining clip 48 captured in a groove circumscribing the main valve member 32 urges the upper diaphragm support washer 36 toward the central region of diaphragm 17 to secure diaphragm 17 against diaphragm retaining ring 38. The vanes 34 are notched to receive an annular main valve seal 50 below retaining ring 38. Main valve seal 50 is preferably fabricated from an elastomeric material.

The main valve unit 30 includes main valve member 32, upper diaphragm support washer 36, diaphragm retaining ring 38, diaphragm 17, retaining clip 48, and main valve seal 50, all of which move toward and away from the main valve seat 18 as a unit. During such movement, an intermediate annular portion 54 of diaphragm 17 is free to flex and stretch while the periphery of diaphragm 17 is held fixedly in place. Axial movement of the main valve unit 30 takes place with the vanes 34 of main valve member 32 guided within a vertical cylindrical wall of the outlet port 16 leading from the main valve seat 18.

Within the main valve member 32, running along its central axis, is a pilot passageway in the form of a circular bore 56 surrounded at its upper end by a pilot valve seat 58 and opening at its lower end into the outlet port 16. The pilot passageway 56 is selectively opened and closed by a pilot valve-sealing member 68.

A main valve spring 60 is compressed between a shoulder 62 formed with the bonnet plate 40 and the top surface of the upper diaphragm support washer 36 thereby urging the main valve unit 30 downwardly into engagement with the main valve seat 18.

The fluid inlet port 14 is bounded by the underside of the main valve unit 30 (including diaphragm 17) and the exterior surface of vertical section 28 of outlet port 16. A reservoir 64 occupies the open volume above the main valve unit 30.

The diaphragm 17 is impermeable to the fluid to be controlled by the proportional flow valve 10. A bleed passageway 66 in the bonnet 40 and valve body 12 enables fluid communication between the reservoir 64 and inlet port 14 so that fluid from the inlet port 14 can enter the reservoir 64 above the main valve unit 30. The bleed passageway 66 has a smaller cross section than the smallest cross section of pilot passageway 56 so that fluid can flow through the pilot passageway 56 faster than through the bleed passageway 66 when the pilot passageway 56 is open.

Figure 2:
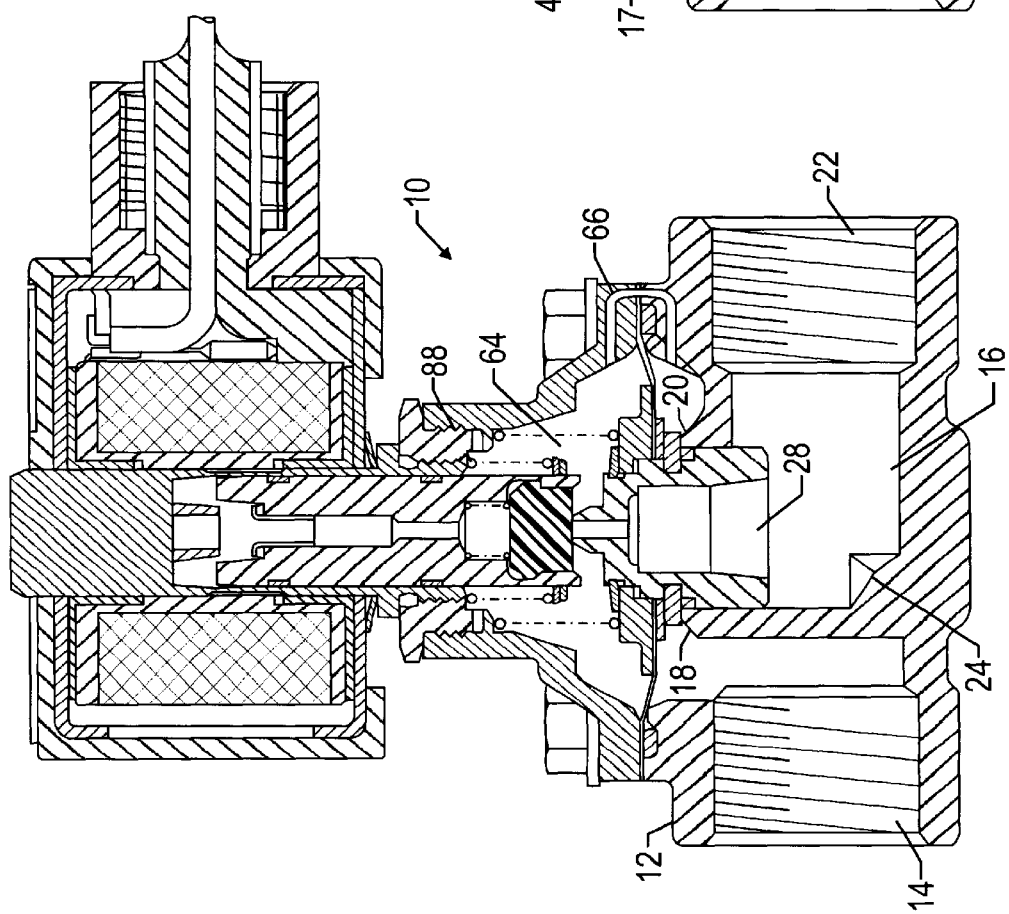
FIG. 2 is a view similar to FIG. 1, but showing the valve while permitting a low range of mass flow rates.

When the pilot valve is closed, as shown in FIG. 1, i.e., when pilot valve sealing member 68 engages pilot valve seat 58, and when the main valve unit 30 is closed, i.e., when main valve seal 50 engages main valve seat 18, fluid cannot flow from the fluid inlet port 14 to the fluid outlet port 16 through main orifice 20. When the pilot valve is open, i.e., when pilot valve-sealing member 68 is not in engagement with pilot valve seat 58, and the main valve unit 30 is closed, as shown in FIG. 2, fluid can flow from the fluid inlet port 14 to the fluid outlet port 16 only through the bleed passageway 66 into the reservoir 64, and then from reservoir 64 through pilot passageway 56. Such fluid flow is therefore limited to a low range of mass fluid flow rates, the actual rate of flow being dependent on the relative time during which the pilot valve is open versus the time during which the pilot valve is closed.

When main valve seal 50 is out of engagement with main valve seat 18, fluid flow can occur through the space between the vanes 34 of main valve member 32. The exposed area of the openings between the vanes 34 increases as the main valve unit 30 rises thereby correspondingly increasing the rate of flow from the fluid inlet port 14 to the fluid outlet port 16.

Initially, for example when the main valve member 32 is removed from the main valve seat 18 by a distance equal to or less than 25% of the diameter of the main orifice 20, flow through the main orifice 20 is restricted and the rate of flow through the pilot passageway 56 makes a significant contribution to the total rate of flow through the valve, i.e., the sum of the mass flow rates through both the main orifice 20 and pilot passageway 56. Under the above-described condition where the main valve member 32 is removed from the main valve seat 18 by a distance equal to or less than 25% of the diameter of the main orifice 20, mass flow through the valve can occur over an intermediate range of rates, greater than the low range to which the valve is restricted when flow is limited to the pilot passageway 56.

Once the main valve member 32 is removed from the main valve seat 18 by a distance greater than 25% of the diameter of the main orifice 20, a high range of mass flow rates is achievable. Flow at high rates occurs principally through the main orifice 20, and the amount of flow through the pilot passageway 56 becomes negligible.

In order to achieve low flow rates solely through the pilot passageway 56 of the valve, i.e., while the valve is in the state shown in FIG. 2, the pilot valve-sealing member 68 is dithered onto and off of the pilot valve seat 58 by a current having frequency and duty cycle which rapidly permits and interrupts the flow of fluid through the pilot passageway 56 so as to maintain sufficient pressure in the reservoir 64 to prevent the inlet pressure beneath the diaphragm 17 from lifting the main valve member 32 off of the main valve seat 18.

The rate of flow through the pilot passageway 56 need not be limited to a single magnitude. By varying the frequency and/or duty cycle of the pulse width modulated solenoid current, the relative time during which the pilot valve opening is exposed to fluid within the reservoir 64, versus the time the pilot passageway 56 is sealed by the pilot valve-sealing member 68, can be varied to continuously increase or decrease the rate of fluid flow through the pilot passageway 56 while preventing the pressure in the reservoir 64 from decreasing enough to permit the diaphragm 17 to raise the main valve member 32 from the main valve seat 18.

Depending on the frequency and pulse width of the solenoid current, the valve will alternate between the off state shown in FIG. 1 and the on state shown in FIG. 2 to permit low rates of fluid flow without opening the main valve, that is, without lifting the main valve member 32 from the main valve seat 18.

Surmounting the bonnet plate 40 is a solenoid actuator 70. The solenoid actuator 70 includes a coil 72 of electrically conductive wire wound around a spool 74 made of non-electrically and non-magnetically conductive material. Suitable terminals are provided for connection to a source of electric current for energizing the solenoid coil 72. A housing 76 of magnetic material surrounds the solenoid coil 72.

A stationary armature or plugnut 78 is located within the upper portion of the spool 74. A core tube 80 extends downwardly from the plugnut 78 and through the remainder of the spool 74. Surrounding the lower portion of the core tube 80 is a collar 82, which is, in turn, fastened to the upper portion of the bonnet plate 40. Fastening between the core tube 80 and collar 82, and between the collar 82 and bonnet plate 40 can be by press fit, welding, crimping, threading or in any other conventional manner of forming a sturdy and fluid tight connection as will be known to those skilled in the art.

Slidably axially disposed within the core tube 80 is a movable armature 84 of magnetic material. Mounted on the movable armature 84 near its lower end is a circumferential flange 86. A pilot valve spring 88 surrounding the movable armature 84 is compressed between circumferential flange 86 and the bottom surface of collar 82 and urges the movable armature 84 downwardly away from plugnut 78. The upper face of the movable armature 84 and lower face of the plugnut 78 are correspondingly profiled so that the two faces mesh as the movable armature 84 moves toward the plugnut 78. At its lower end, the movable armature 84 carries the pilot valve-sealing member 68 formed of resilient material.

When solenoid coil 72 is de-energized (FIG. 1) and the fluid inlet port 14 of proportional flow valve 10 is connected to a source of pressurized fluid, e.g. a gasoline pump, the fluid is forced through the bleed passageway 66 into the reservoir 64 above the main valve unit 30. The area of the top of the main valve unit 30 exposed to the fluid is greater than the area of the bottom of the main valve unit 30 exposed to the fluid. Hence, the force of the fluid on the top of main valve unit 30, combined with the force of the spring 60, holds main valve seal 50 against main valve seat 18 to close the proportional flow valve 10. When solenoid coil 72 is first energized by an electric current (FIG. 2), movable armature 84 is attracted to plugnut 78, and hence begins to move upwardly against the force of spring 88. As movable armature 84 rises, it moves pilot valve sealing member 68 away from pilot valve seat 58, thereby permitting inlet fluid to flow through passageway 56 into outlet port 16 which is at the lower outlet pressure. Because the effective flow rate through the pilot passageway 56 is greater than the effective flow rate through the bleed passageway 66, the pressure above the main valve unit 30 and diaphragm 17 begins to decrease. Although the pilot passageway 56 in the illustrated preferred embodiment of the invention is of larger diameter than the bleed opening, it is possible to have a greater effective flow rate through the pilot passageway 56 than through the bleed opening even if the pilot passageway 56 has the smaller diameter when the passageways 56 and 66 are such that turbulence retards the rate of flow through the bleed passageway 66 relative to the rate of flow through the pilot passageway 56.

If the frequency and pulse width of the solenoid current are sufficient to raise the pilot valve sealing member 68 from the pilot valve seat 58 for a large enough proportion of time, the upward force of the fluid inlet pressure on the main valve unit 30 begins to exceed the downward force of the fluid pressure on the main valve unit 30, the main valve unit 30 begins to rise (FIG. 3), and main valve unit 30 moves away from main valve seat 18. Main valve seal 50 disengages main valve seat 18 and communication between fluid inlet port 14 and fluid outlet port 16 through the spaces between vanes 34 of main valve member 32 is enabled, thereby initially permitting intermediate range fluid flow from inlet port 14 to outlet port 16.

The main valve unit 30 continues to rise until pilot valve seat 58 engages pilot valve sealing member 68, i.e., the pilot valve is closed. As a result, high-pressure fluid cannot escape from the reservoir 64. As fluid entering reservoir 64 builds up, the downward force on the valve unit 30 increases until it, in combination with the downward force of the spring 60, again exceeds the upward force of the inlet fluid against the bottom of main valve unit 30. The result is downward movement of the main valve unit 30. However, as soon as the main valve unit 30 begins to move downwardly, pilot valve-sealing member 68 opens, once again permitting high pressure fluid above the main valve unit 30 to escape through passageway 56 to the fluid outlet port 16. An equilibrium position (FIG. 4) is quickly established in which main valve unit 30 constantly oscillates a very short distance as pilot valve-sealing member 68 is repeatedly opened and closed.

The location of the main valve unit 30 as unit as it oscillates is determined by the position of movable armature 84 and, hence, pilot valve sealing member 68. This position also determines the spacing between main valve member 32 and main valve seat 18, and hence determines the rate of flow through the main orifice 20.

Whether intermediate or high mass flow rates are obtained, is determined by the extent to which the main valve member 32 is raised from the main valve seat 18, which is in turn set according to the position of movable armature 84 is a function of the duty cycle and/or frequency of the pulse width modulated current applied to solenoid coil 72, the preferred method of current control on solenoid activated proportional flow control valves being by pulse width modulation (PWM).

With pulse width modulation, as employed in prior art proportional solenoid valves, a fixed frequency variable duty cycle square wave is applied to the coil of the solenoid in order to vary the current in the coil in a linear fashion, thereby varying the force exerted by the solenoid on the valve actuating mechanism, and thus changing the flow through the valve. The use of a square wave signal has two distinct advantages over the use of a linear amplifier to control of the solenoid current. First, the switching type of controller has much greater efficiency than a linear amplifier. Second, the proper choice of the fixed switching frequency of the square wave can provide a small variation in solenoid current that translates into a mechanical dither of the raised solenoid armature which, in turn, reduces the effects of static friction and mechanical hysteresis in the valve. By carefully controlling the mechanical dither via pulse width modulation and/or frequency modulation, selection of a desired rate of mass flow through the pilot passageway 56 is possible over a range of flow rates without opening the main valve. This range is herein referred to as a low range of mass flow rates.

Intermediate and high flow rates are achieved by increasing the duty cycle of the pulse width modulated solenoid current so that the magnitude of flow through the pilot passageway 56 is great enough to relieve the pressure in the reservoir 64 above the main valve member thereby permitting the main valve member 32 to rise off of the main valve seat 18.

If the pulse width modulation voltage has a 50% duty cycle, the current flowing through the solenoid coil 72 will be 50% of maximum. As a result, the movable armature 84 will rise though one half its maximum stroke between its position when the main valve is closed (FIG. 1) and its position when the main valve is fully open (FIG. 4), i.e., when its upper face engages the lower face of the plugnut 78. Consequently, the main valve unit 30 will be permitted to rise through just 50% of its maximum rise, and hence main valve unit 30 will be spaced from main valve seat 18 about ½ of the maximum spacing. Thus, approximately ½ of the rate of maximum flow through the valve will be permitted between fluid inlet port 14 and fluid outlet port 16.

If the voltage is on 75% of the time and off 25%, i.e., there is a 75% duty cycle, movable armature 84 will rise through ¾ of its maximum stroke, and as a result approximately ¾ of the rate of maximum flow through the valve will be permitted between fluid inlet port 14 and fluid outlet port 16. It will be appreciated, therefore, that the rate of high volume flow through the main valve is proportional to the amount of current supplied to the solenoid coil 72.

Intermediate and high mass flow rates can be achieved depending on the maximum stroke of the solenoid armature and the diameter of the main orifice 20. For example if the pulse width modulation voltage has a 25% duty cycle, the current flowing through the solenoid coil 72 will be 25% of maximum. As a result, the movable armature 84 will rise though one quarter its maximum stroke. Consequently, the main valve unit 30 will be permitted to rise through just 25% of its maximum rise, and main valve unit 30 will be spaced from main valve seat 18 about ¼ of the maximum spacing. If the diameter of main orifice 20 is greater than 25% of the maximum stroke of the movable armature 84, flow will be in the intermediate range.

When operated at high flow rates, i.e., where fluid flow is primarily across the main valve seat 18, the valve 10 of the instant invention behaves like the valve of U.S. Pat. No. 5,294,089. That valve is a fluid assisted design, which by the control of a small pilot orifice, allows the solenoid to effectively position the diaphragm which, in turn controls the flow through a much larger orifice. This type of valve typically has a turn down ratio of about 10 to 1 in flow over its control range. As in the case of the aforementioned prior art valve, control of armature position is most precise when a pulsed DC source is applied to the solenoid coil 72, as compared to simply varying the amplitude of a continuous DC current.

Prior art valves are operable only in the intermediate and high ranges. Pulsing the current in such valves imparts a dither to the movable armature 84 with an amplitude that is very small in comparison with the displacement of the main valve member 32 from the main valve seat 18. Hence the dithering has negligible effect on flow rate which is determined by the exposed area of the openings between the vanes 34, and which increases as the main valve unit 30 rises.

In the valve 10 of the present invention, low rates of flow occur solely through the pilot passageway 56. To achieve low flow rates over a continuous range, the pulse width and frequency of the dithered pilot valve-sealing member 68 are varied to determine the rate of fluid flow through the valve 10. It has been found that pulsing the solenoid 70 over a carefully controlled range of pulse durations will allow precise control of flow through the pilot passageway 56 in the valve without causing the diaphragm 17 to open the main valve by raising the main valve member 32 from the main valve seat 18. By simultaneous variation of the pulse width and frequency of the wave form applied to the solenoid coil 72, a close approximation of a linear correspondence between current and flow rate in the low flow range can be obtained, as has heretofore been done in the intermediate and high flow ranges. Moreover, the transition from low flow range to the intermediate flow range can be made transparent with no abrupt discontinuity in the current vs. flow characteristic, as can be done in the transition from the intermediate flow range to the high flow range.

For low flow rates, the "on" time of the pulse must be within a range that allows the solenoid to lift the pilot valve-sealing member 68 from the pilot seat 58 but does not allow the pilot valve-sealing member 68 to expose the pilot passageway 56 sufficiently to cause the diaphragm 17 to lift the main valve member 32 from the main valve seat 18. Also, the frequency of the current applied to the solenoid coil 72 must be limited to a range over which the armature of the pilot solenoid 70 will continue to operate in a pulsing mode.

Balancing of three mechanical parameters enables achievement of a continuous range of low flow rates, each of which can be selected by controlling the frequency and pulse wave duty cycle of the solenoid coil current. These mechanical parameters are pilot orifice area, effective bleed passageway 66 area and diaphragm hold down spring constant and spring force.

The area of the pilot passageway 56 is a major controlling factor in achieving a wide range of low flow rates. As the cross sectional area of the pilot passageway 56 increases, so too does the range of available low flow rates or turn down ratio of the low flow region of the current vs. flow rate characteristic.

The bleed passageway 66 of the proportional solenoid valve balances the pressures and forces above and below the diaphragm 17. The cross sectional area of the bleed passageway 66 is typically smaller than the cross sectional area of the pilot passageway 56 through the main valve member. Exposure of the pilot passageway 56 by lifting of the pilot valve-sealing member 68 from the pilot valve seat 58 causes a pressure imbalance across the diaphragm 17, which urges the valve main member 32 away from the main valve seat 18. Conversely, sealing of the pilot passageway 56 balances the pressures on both sides of the diaphragm 17 thereby allowing it to be closed in response to a mechanical force, e.g., from the spring 60. The size of the bleed passageway 66 is somewhat critical if the bleed area is too small, pressure in the reservoir 64 will decrease so rapidly during the opening phase of the pulse cycle as to cause the diaphragm 17 to lift the main valve member 32 prematurely, thus limiting the high end of the low flow range. A bleed area which is too large, while potentially extending the flow range obtained by dithering the pilot valve-sealing member 68 onto and off of the pilot valve seat 58, would interfere with the unbalancing of the pressures on either side of the diaphragm 17 needed to displace the main valve member 32 from the main valve seat 18 for transition to the high flow range, i.e., across the main valve seat 32.

It has been found that by placing on top of the diaphragm 17, a spring having an appropriate spring constant and spring force, it is possible to keep the main valve member 32 in a closed position, i.e., sealing the main orifice 20, thereby allowing operation at higher duty cycles and frequencies, thus maximizing the low flow range.

By balancing solenoid duty cycle and frequency, pilot passageway 56 area, bleed passageway 66 area, and diaphragm spring constant and spring force, high turn-down ratios, i.e., wide ranging flow rates, can be achieved by a single proportional solenoid valve.

EXAMPLE 1

In a proportional solenoid valve having a circular pilot opening 0.078 inches (1.98 mm) in diameter, a bleed channel 0.073 inches (1.85 mm) in diameter, and a diaphragm hold-down spring with a spring force of 1.5 lbs. (0.68 kg) a low flow range of 0.5–5.0 scfm (14.16–141.8 l/min.) was obtainable by varying the pulse width duty cycle and frequency of the solenoid coil current from 8% and 20 Hz to 50% and 25 Hz, respectively. Depending on the size and design of the valve, frequencies as high as 40 Hz or more, when combined with appropriate duty cycles, can be effective in obtaining low flow rates over a substantial range.

Figure 5:
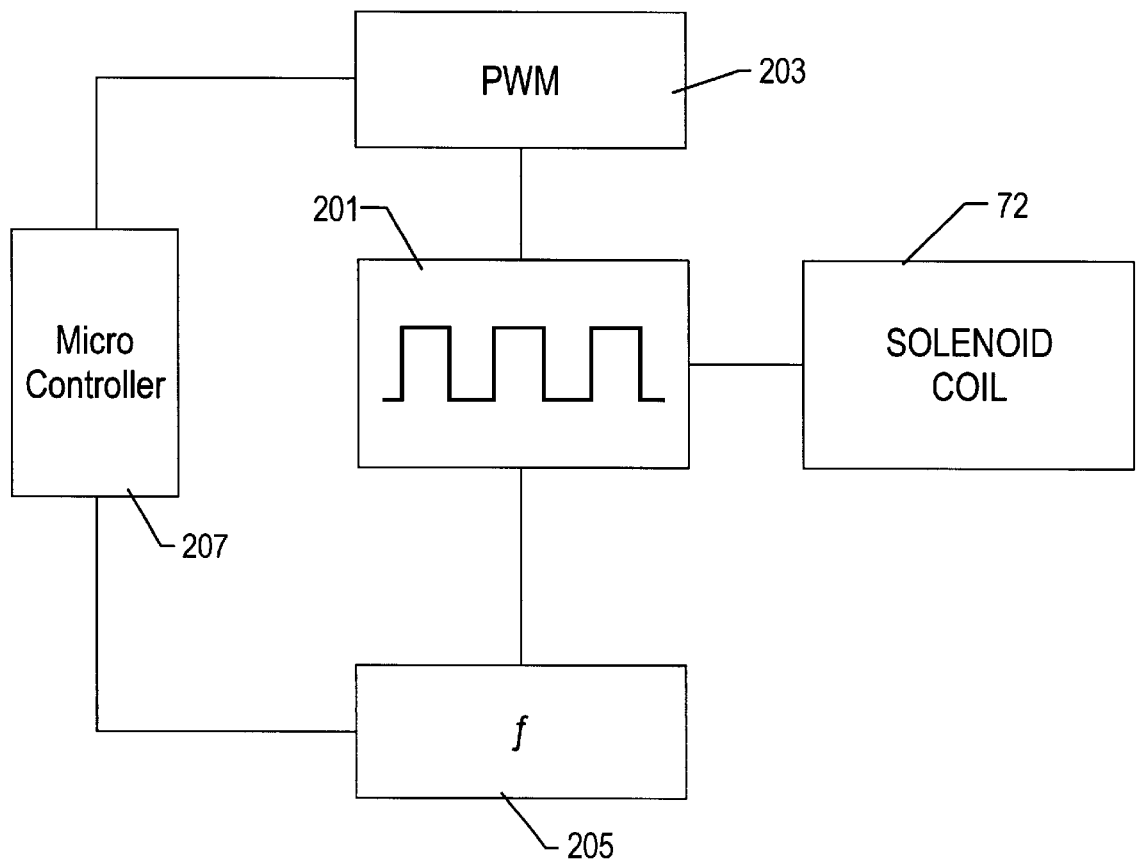
FIG. 5 is a schematic block diagram depicting the power supply for the solenoid of FIGS. 1–4.

Referring now to FIG. 5 of the drawings, a square-wave generator 201 applies current in the form of pulsed DC signals to the solenoid coil 72 of the proportional valve solenoid 70. The duty cycle, i.e., the percentage of on-time vs. off-time for a single cycle of the square wave signal is controlled by a pulse width modulator 203 the construction of which will be known to those skilled in the art. A frequency setting circuit 205 is also provided for setting the number of cycles per second of the pulsed DC signal produced by the square-wave generator 201. The construction of the frequency setting circuit will also be known to those skilled in the art.

A manual control device (not shown), e.g., a control lever on a handle of a gasoline pump, can be mechanically linked to a transducer (not shown) for sending signals to a digital microcontroller 207 which is connected to the pulse width modulator circuit 203 and frequency adjusting circuit 205 for simultaneously adjusting the frequency and duty cycle of the DC pulses applied to the solenoid coil 72 by the square-wave generator 201. The microcontroller 207, pulse width modulator circuit 203, and frequency setting circuit 205, may be designed and/or programmed so that narrow pulses are applied, i.e., the pulsed waveform has a low duty cycle, for enabling low flow rates at which time the solenoid armature is dithered for allowing flow only through the pilot opening of the proportional valve while preventing lift off of the main valve member from the main valve seat. Moreover, the duty cycle and frequency of the solenoid coil current may be adjusted to increase the rate of flow through the pilot opening while still preventing main valve member lift-off. Flow rate is still further increased by enlarging the duty cycle of the solenoid coil current beyond a percentage where lift-off of the main valve member from the main valve seat occurs.

It has been found that by employing an extended range proportional valve in accordance with the invention, a substantially linear relationship between flow rate and pump handle position may be achieved over a range from very low flow rates to very high flow rates, thereby enabling linear flow control over a turn-down ratio of as much as 100 to 1 or more.

In designing an extended range proportional valve in accordance with the invention, it is preferable to model the operation of the valve by examining the response of the valve to a PWM (pulse width modulated) control voltage that is applied to the coil of the solenoid operator. This voltage waveform causes a variation in the position of the armature of the solenoid. The motion of the armature of the solenoid, in turn, causes a variation in rate of mass flow through the valve.

The motion of the armature can be described by a standard second order differential derived from a free body diagram of the armature and all relevant forces acting on it, including gravity, return spring force, and the magnetic force of attraction.

$$M\frac{d^2x}{dt^2} + B\frac{dx}{dt} + Kx = F - F_0$$

where x=Displacement of the armature from its initial position in meters

F=The magnetic attraction force on the armature in newtons t=time in seconds

M=Mass of armature in kilograms

B=Friction force on the armature in newton/meter/sec

K=Spring constant of armature spring in newton/meter $F_o$=The initial force on the armature that must be overcome to start motion, in newtons The dynamics of the electric circuit of the solenoid coil, which is driven by the PWM excitation voltage, are described by the following relationships:

During the 'ON' period of the PWM signal:

$$E = N\frac{d\phi}{dt} + IR$$

During the 'OFF' period of the PWM signal:

$$N\frac{d\phi}{dt} + IR = 0$$

where

Φ=Total flux in webers, which links the turns of the solenoid coil

I=Coil current in solenoid (amps)

R=Resistance of solenoid coil (ohms)

E=Voltage on solenoid coil when during on period of PWM signal (volts)

N=Number of turns in the solenoid coil

The coil current in the solenoid and the magnetic attraction force on the armature in newtons are both functions of the total flux which links the turns of the solenoid coil, and the displacement of the armature from its initial position, i.e., I=f (Φ, x) and F=f (Φ, x).

Both of the above relationships are non-linear functions that are dependent upon the geometry of the solenoid operator and the materials from which the valve components are constructed. Solutions to the foregoing equations may be obtained by modeling the mechanical and electrical elements of the valve on a digital computer by use of circuit solver software, such as the commercially available SPICE program. In such a model, the electrical driver circuitry is directly modeled by electrical elements, and the mechanical components are represented by corresponding electrical analogs.

The magnetic coupling of back electro-magnetic force (emf) (Ndφ/dt), core position, current, and solenoid force can be modeled with the use of an element that accepts tabular data about the solenoid's parameters. This tabular data can be extracted from a magnetic finite element analysis of the solenoid over a range of operating conditions with solutions obtained for various values of core position and coil excitation. An example of a commercially available software solver capable of performing this analysis on a digital computer is EMSS by Ansoft of Pittsburgh Pa. This solver integrates magnetic finite element analysis programs with a version of the SPICE program. By modeling this problem in such a solver, a solution in the form of a time variant waveform that represents the displacement x, i.e., the displacement of the armature from its initial position, can be obtained.

In the range of low mass flow rates, the total mass flow through the valve is equal to pilot flow only. That is, the main valve member remains seated on the main valve seat thereby preventing flow through the main valve opening. Using the displacement, x, as determined by the solver, the mass flow of a gas or liquid through the pilot opening of the main valve member can be calculated from the following relationships:

Where the fluid passed through the valve is a gas:

$$M_{Pilot(gas)} = (KP_1 C_d \pi x D_1 N_{1,2})/(T^{1/2})$$

where

γ=gas constant

M=Mass flow per unit of time

R°=degrees Rankine (1 R°=1.8 K)

x = Displacement of the armature from its initial position in inches

K = Constant $(R^{o\frac{1}{2}})$/unit temp. $= [(\gamma-1)/2\gamma/((P_1/P_2)^{(\gamma-1)/\gamma}-1)]^{-(1/\gamma)}$ $P_1$ = Inlet pressure in psia (1 kPa=6.8947573 psia)

$P_2$ = Pressure downstream of main valve seat $C_d$ = Discharge coefficient $D_1$ = Pilot sealing surface diameter $N_{12}$ = Ratio of actual flow to sonic flow per unit area at given values of total temperature and pressure $= [(P_2/P_1)^{2/\gamma} - (P_2/P_1)^{(\gamma+1)/\gamma}/((\gamma-1)/2(2/\gamma+1))^{(\gamma+1)/(\gamma-1)}]^{1/2}$ T = Inlet temperature in $R^o$ Where the fluid passed through the valve is a gas:

$$M_{Pilot(liquid)} = C_d x D_1 (2g_c p(P_1-P_2))^{1/2}$$

where $g_c$ = gravitational constant (386 in-lb/lb-sec$^2$) (9.80665 m/s$^2$)

p = density (lb/in$^3$) (1 kg/m$^3$=27679.905 lb/in$^3$)

The total mass flow through the valve equals mass pilot flow until the displacement of the main valve member from the main valve seat, i.e., diaphragm stroke, $X_d > 0$.

In order to determine when the main valve member is lifted from the main valve seat, thereby unsealing the main valve opening for increasing the mass flow rate through the valve opening for increasing the mass flow rate through the valve, the relationship between the changes in pressure, temperature and volume occurring within the valve can be considered as follows:

The Ideal Gas Equation is known to be M=PV/RT where

P = pressure in diaphragm chamber

V = volume in diaphragm chamber

R = perfect gas constant

M = mass of gas in diaphragm chamber

Taking the derivative of the Ideal Gas Equation:

$$m/M = p/P + v/V + t/T = 0$$

where m = change in mass M v = change in volume V p = change in pressure P t = change in temperature T Assuming a polytropic process, the relationship pressure change to volume change is calculated from the following:

$$p = nPA_d X_d/V$$

where $A_d$ = diaphragm area $X_d$ = diaphragm movement n = number between 1 (for constant temperature) and $\gamma$ (for constant entropy)

$\gamma$ = ratio of specific heats

Solving for $X_d$ gives the diaphragm displacement:

$$X_d = pV/nPA_d$$

By varying the duty cycle of the pulse width modulated current in the solenoid coil, and/or the frequency of the current, to dither the pilot valve member onto and off of the pilot valve seat, mass flow rates can be achieved over a continuous low range. When the rate of pilot mass flow is increased to a magnitude where the differential pressure across the main valve member causes it to be initially raised from the main valve seat, mass flow through the pilot opening in the main valve member is supplemented by limited mass flow through the main valve opening which is partially blocked by the main valve member being in close proximity to the main valve opening. While the main valve member is displaced from the main valve seat a distance equal to or less than 25% of the diameter of the main valve opening, mass flow rates over an intermediate range can be achieved. Once the main valve member is raised from the main valve opening by a distance position greater than 25% of the diameter of the main valve opening, mass flow rates over a high range can be achieved.

Once the main valve opening is unsealed, the mass flow rate throughout the intermediate range of flow rates can be calculated as follows:

$M_{total}$ = mass flow rate through the extended range proportional valve $$M_{total @ X_d < 0.25D_2} = M_{diaphragm} + M_{pilot}$$

where $D_2$ = diameter of the main valve opening $M_{diaphragm}$ = mass flow rate through the main valve opening $M_{pilot}$ = mass flow rate through the pilot opening As main valve member displacement increases and the main valve member is no longer in close proximity to the main valve opening, the rate of mass flow through the pilot opening in the main valve member becomes insignificant relative to the rate of mass flow through the main valve opening and can be ignored. Hence, the mass flow rate throughout the high range of flow rates can be calculated as follows:

$$M_{total @ X_d > 0.25D_2} = M_{diaphragm}$$

$$M_{diaphagm(gas)} = (KP_1 A_1 N_{12})/(T^{1/2})$$

$$M_{diaphagm(liquid)} = A_1 (2g_c p(P_1-P_2))^{1/2}$$

where $A_1 = X_d C_d D_1 \pi$ = effective area of main valve opening

The effective area of the main valve opening when the main valve member is displaced from the main valve seat by less than 25% of the diameter of the main valve opening is equal to the area of the main valve opening across which an equal pressure drop occurs under similar conditions when the main valve member is sufficiently displaced from the main valve seat so as not to affect mass flow rate through the main valve opening.

EXAMPLE 2

In an extended range proportional valve that was constructed in accordance with the preferred embodiment of the invention for controlling the flow of natural gas (methane gas constant used), the following parameter values applied:

K = Gas constant $(R^{o\frac{1}{2}})$/unit temp. $= [((ratio\ of\ specific\ heats, \gamma-1)/2\gamma)\ ((P_1/P_2)\ (\gamma-1)/\gamma-1)]-(1/\gamma) = 23.14$ $P_1$ = Inlet pressure in=79.7 psia $C_d$ = Discharge coefficient 0.35 (takes into account loss due to inlet restriction)

$D_1$ = Pilot sealing surface diameter=0.056"

$N_{12}$ = Ratio of actual flow to sonic flow per unit area at given values of total temperature, and pressure=$P_2$=0.95$P_1$=75.72 psia Therefore, $$N_{12}=0.4507[(P_2/P_1)^{2/\gamma}-(P_2/P_1)^{(\gamma+1)/\gamma}/((\gamma-1)/2(2/(\gamma+1))^{(\gamma+1)/(\gamma-1)})]^{1/2}$$

T=Inlet temperature in degrees Rankine (R°)=527
$C_dD_1$=main orifice=0.328"–(0.1652 to 0.326)
M=Mass of armature in kilograms=0.0277
B=Friction force on the armature in newton/meter/second=9.0
K=Spring constant in newton/meter=2185
$F_o$=Initial force on the armature that must be overcome to start motion, in newtons=1.338
R=Resistance of solenoid coil=6.5 ohms
N=Number of turns in the solenoid coil=850

It is to be appreciated that the foregoing is a description of a preferred embodiment of the invention to which variations and modifications may be made without departing from the spirit and scope of the invention. For example, this invention could also be applied to a pilot operated proportional solenoid valve design wherein pressure on a rigid piston, instead of a flexible diaphragm, is used to lift the main valve member.

FIGS. 6–10 illustrates certain features of one exemplary embodiment of a fluid flow system constructed in accordance with certain teachings provided herein.

Figure 6:
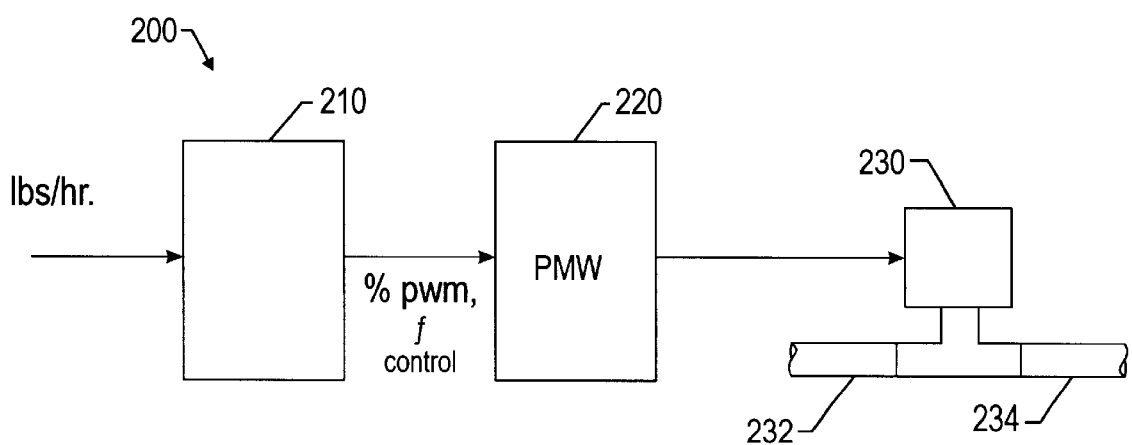
FIG. 6 is a schematic diagram depicting an illustrative embodiment of the present invention.

Referring first to FIG. 6, a fluid control system 200 is illustrated that includes a controller 210; a power circuit 220 for generating a pulse width modulated signal at one of two fixed frequencies; and a valve 230 that receives at its actuator the pulse width modulated signal from the power circuit 220 and that, in response, controls the flow of gas or fluid from an inlet fluid feed line 232 to an outlet fluid line 234.

The controller 210 receives at its input a fluid flow command signal that corresponds to a desired rate of fluid flow through valve 234. This command signal may take the form of an analog or digital command signal that represents, for example, the desired rate of fluid flow in pounds of fluid per hour or other such units such as kilograms per second. The controller 210 receives the command signal and, in response, generates output control signals that correspond to a fixed frequency and a percent duty cycle that are provided to the power circuitry 220. The power circuit 220 responds to those signals by generating a fixed-frequency pulse width modulated signal having an active duty cycle corresponding to the command from controller 210. The valve 230, which is similar to the valve previously discussed in connection with FIGS. 1–4, will regulate the flow of fluid from line 232 to line 234 in response to the pulse width modulated signal.

Figure 7:
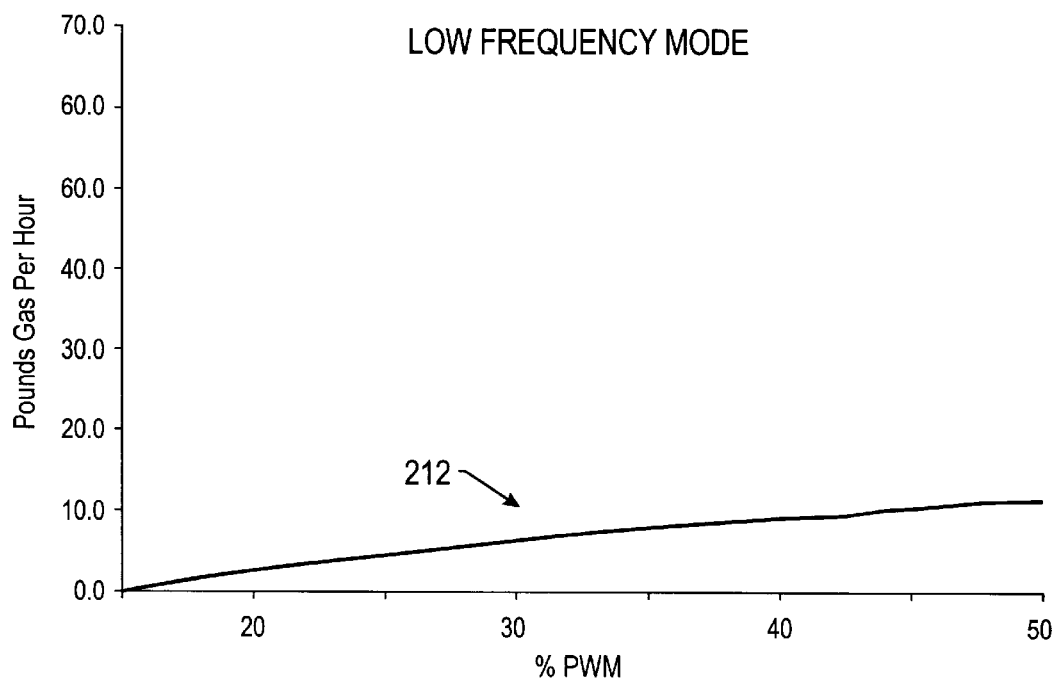
FIG. 7 is a graphic representation of a mapping curve of low frequency PWM signal verses flow.

The controller 210 may be constructed using appropriate digital or analog circuitry and may take the form of a microprocessor based digital controller that is independent or part of a larger control system. In general, the controller 210 will be constructed to provide a "mapping" of the input flow command signal to a desired fixed-frequency and duty cycle, FIG. 7 illustrates an exemplary mapping curve 212 that may be implemented by controller 210 for low frequency mode control. Specifically, it illustrates the mapping curve 212 that represents various flow rates and duty cycles for an exemplary valve. In the illustrated mapping curve 212, the frequency of the PWM signal corresponding to the illustrated parameters is not variable but is fixed at a relatively low frequency, such as 31 Hz. The low frequency may be selected to correspond to the physical characteristics of the valve 230 to be controlled by controller 210 such that, in response to PWM signals at that frequency and below a certain duty cycle, the vast majority of the flow through the valve 230 is through the pilot orifice of the valve, in accordance with the low flow mode previously discussed. The mapping curve 212 represented by FIG. 7 may be implemented in controller 210 through the use of a look-up table, a form of curve fitting, or other appropriate means.

As an inspection of the mapping curve 212 of FIG. 7 will reveal, the slope of the curve 212 is relatively constant and relatively small such that the curve 212 is relatively "flat". In other words, the change in the fluid flow rate as a percent of the change in duty cycle is not that significant for the duty cycle ranges illustrated. This is beneficial in that it allows for a smooth transition to be made to an alternate mode of flow control where a different and higher, fixed frequency is used for the PWM signal provided to valve 230.

As will be apparent from the previous discussion of the valve of FIGS. 1–4 and as the duty cycle of the low-frequency PWM signal applied to the valve increases, a point will be reached where there is significant fluid flow through the pilot orifice and, potentially, fluid flow through the main valve as well. At that point, accurate control of the fluid flow may be difficult because—at the relatively low frequency—the further upward adjustments may not allow for easy and accurate adjustment of the flow rate through the valve 230. As such, when this point is reached, the controller 210 will implement a "high frequency" control mode, where the fixed frequency command provided to the power circuit 220 changes from the relatively low frequency used for the low frequency mode of control discussed in connection with FIG. 7 to a relatively high frequency. In the particular example under discussion, the high frequency is 160 Hz.

It should be noted that the specific valves assigned to the "low frequency" and "high frequency" mode of control will depend, in large part, on the mechanical construction of valve 230 and the electrical properties of the solenoid actuator used in the valve. Specifically, the low frequency should be selected such that the application of a PWM signal to the valve 230 in that frequency range will allow the pilot valve member to move up and down to open and close the pilot orifice between each PWM pulse. Further, the high frequency should be selected such that application of a PWM signal in that frequency range, at the anticipated duty cycle, will result in a relatively stable positioning of the pilot valve member without significant movement or dither.

Figure 8:
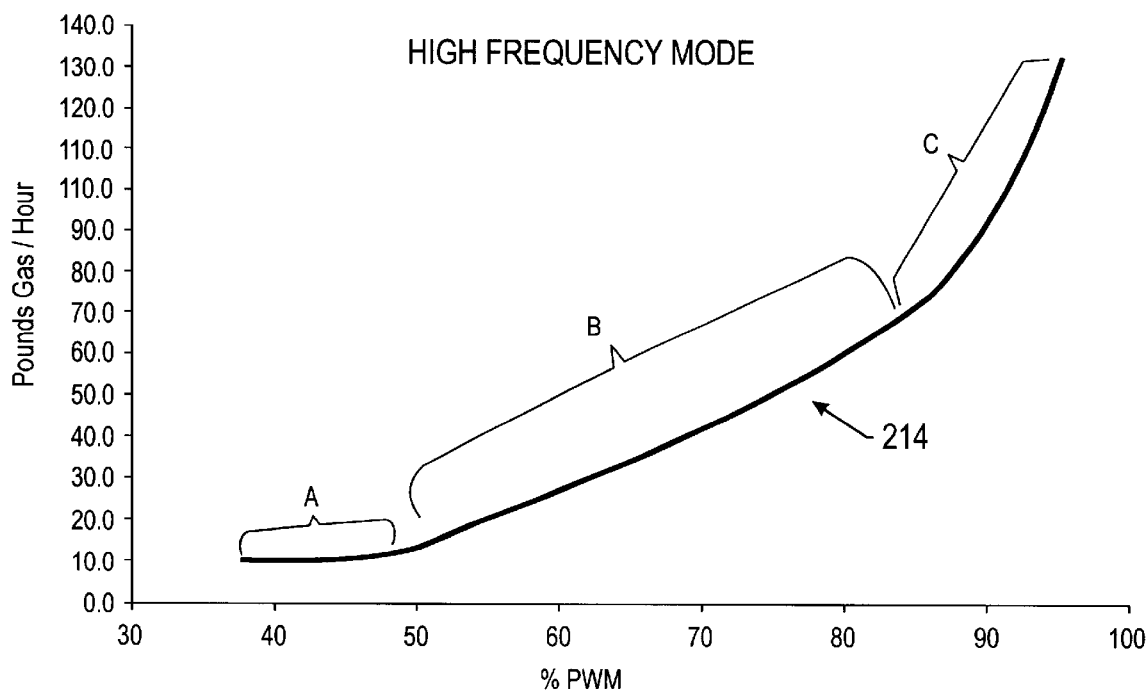
FIG. 8 is a graphic representation of a mapping curve of high frequency PWM signal verses flow.

FIG. 8 illustrates an exemplary mapping curve 214 that may be implemented by controller 210 for high frequency mode control. As may be noted, the illustrated mapping curve 214 does not begin with a duty cycle of 0%, but rather with a duty cycle of approximately 40%. This is because, under the control scheme implemented by controller 210, the controller will typically implement the high frequency control mode after some flow through valve 230 has been established through control of the valve in the low frequency mode. It may be noted from an inspection of the curve in FIG. 8 that the illustrated curve has three basic sections A, B and C. Section A represents the low flow end of the curve 214 and, as may be noted, has a relatively low and flat slope. Section B has a much higher slope, while section C has an extremely steep slope. In general, section C represents the point where the PWM active duty cycle is at or near 100% and the fluid flow through the valve 230 has reached a maximum value. Section B represents a section of approximately constant slope, which should correspond to the normal "high-frequency" operating conditions of valve 230.

Section A of FIG. 8 differs significantly from section B in that its slope is significantly less and the mapping curve 214 is essentially flat over a reasonable range of active duty cycles. From a comparison of FIG. 8 with the "low frequency" curve of FIG. 7, it may be noted: (1) that the flattened section A has essentially the same slope as the slope of the low-frequency curve 212, and (2) that the values of the flow-rates and duty-cycles for the high frequency curve 214 over that range essentially overlap the flow-rates and duty-cycles for the low-frequency curve 212 over that range. This overlap allows for a smooth transition to be made from the low-frequency mode of control to the high frequency mode of control as the fluid flow through valve 230 is increased.

Because of the overlap of the high frequency and low-frequency curves 212 and 214 in the identified ranges, the controller 210 may perform a transition from the low frequency mode of control to the high frequency mode of control as follows:

First, as the flow through valve 230 is brought up from zero, the controller 210 will operate in the low frequency mode, using low frequency mapping, such as the mapping curve 212 illustrated in FIG. 7, until a point is reached where the active duty cycle reaches a point corresponding to the overlap region identified above. At that point, in response to a further increase of the fluid command signal, the controller 210 will shift to the high-frequency mode of control and will then implement a high frequency mapping, such as the mapping curve 214 illustrated in FIG. 8. Because of the operating characteristics of valve 230 in response to the low and high frequency PWM signals provide for the overlap region identified above, this transition from low-frequency to high-frequency control occurs without any significant changes in the PWM duty cycle or any significant changes in the flow through the valve 230. Thus, by performing a transition from low frequency mode control to high frequency mode control within the overlap range, controller 210 allows for smooth fluid flow control over a wide range of flow rates.

The particular duty cycle/flow rate where the transition from low frequency to high frequency mode control occurs is not significant as long as the transition occurs within the overlap region described above. Further, while the above discussion was in the context of transitioning from a low frequency mode control to a high frequency mode control as the fluid flow increased, a transition could also occur from a high frequency mode to a low frequency if a controlled decrease in the fluid flow through valve 230 is desired. Where smooth control of both fluid increases and fluid decreases is desired, controller 210 may be constructed to transition at different points within the overlap region on the low-high and high-low transition so as to provide a form of hysteresis to prevent repeated transition if the fluid command is changing slightly about a point in the region.

The outputs of controller 210 identifying the low or high fixed frequency and a given active duty cycle may take the form of digital or analog signals. They are provided to power circuit 220, which may be of conventional construction. Power circuit 220 converts the control signals to a fixed frequency signal that is applied to the valve 230 to effect control of flow through the valve 230. In this manner, system 200 allows for effective control of fluid flow over a wide range of flow rates.

Figure 9:
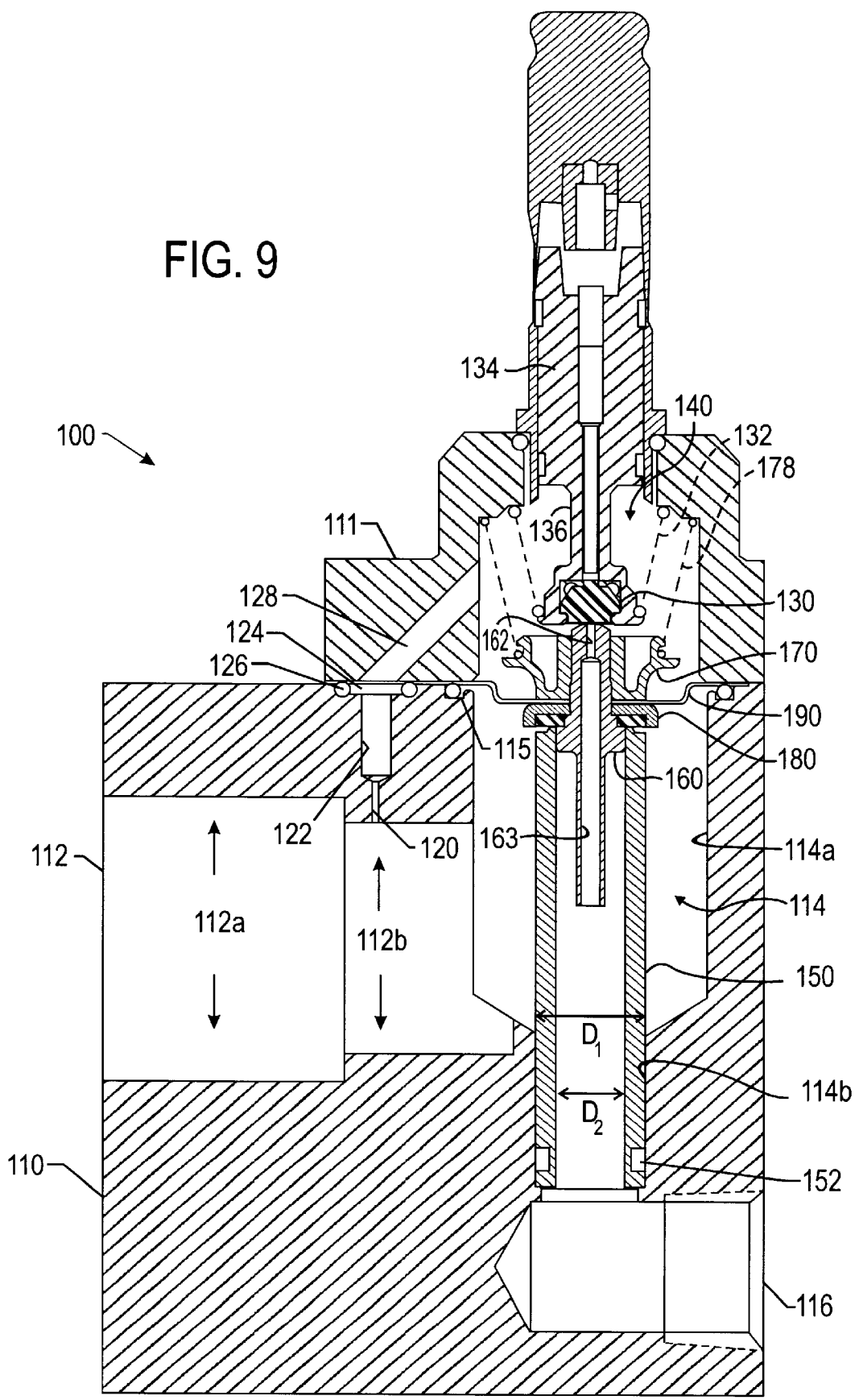
FIG. 9 is a cross sectional view of an illustrative embodiment of the present invention depicting a closed valve.

As the above discussion indicates, the effective operation of system 200 of FIG. 6 is enabled by the fact that the characteristics of valve 230 are such that there is a region of overlap between the flow-rate versus active PWM duty cycle characteristics of the valve 230 when receiving a PWM signal at the low frequency and the same characteristics of the valve 230 when receiving the high frequency PWM signal. The existence of this overlap region and the extent of this region are defined to a great extent by the design and construction of valve 230. FIG. 9 illustrates a valve 100 in detail that provides the desired overlap characteristic identified above, as well as other characteristics suitable for a fluid control system such as that illustrated in FIG. 6.

The valve 100 of FIG. 9 includes many of the elements and components of the valve illustrated and described in connection with FIGS. 1–4 although the arrangement and construction of such components differs in some respects from the previously-described valve. In general, the operation of valve 100 is the same as that previously discussed in connection with the valve of FIGS. 1–4.

Valve 100 includes a valve body 110, which may be formed of metal or any other material suitable for the fluids that are to be used with the valve 100. Valve body 110 defines an inlet port 112. The inlet port 112 has two sections, a first section 112a having a first diameter and a section 112b having a second diameter that is less than the first diameter. Although not illustrated in FIG. 9, the inlet port 112 may be attached to a coupling device or tube (not shown), such as a VCR fitting, to allow the valve to be connected to a fluid line.

Valve body 110 also defines a bleed tube 120 extending in a direction perpendicular to the direction of the inlet port 112. The bleed tube 120 feeds into a small cylindrical reservoir 122 that is also defined by valve body 110. In the illustrated valve 100, the bleed tube 120 extends from the section 112b of the inlet port. The cylindrical reservoir 122 has a diameter that is greater than the diameter of the bleed tube 120. In the illustrated example, the valve body 110 also defines a recessed area 124 for receiving an O-ring or other appropriate sealing member represented by element 126 in FIG. 9. While the valve body 110 will typically be formed of a metallic material of alloy, the sealing member 126, as well as the other sealing member discussed below, will typically be formed from a compressible, elastomeric material.

Valve body 110 further defines a main reservoir 114 that extends in a direction parallel to that of the bleed tube 120 but perpendicular to that of the inlet port 112. The main reservoir 114 has two sections: a first section 114a that is generally cylindrical and has a first diameter, and a second section 114b that extends from the first section 114a and has a diameter less than that of the first section 114a. The main reservoir 114 is in fluid communication with the inlet port 112 such that fluid flowing into the inlet port 112 will flow into reservoir 114. Near the top of reservoir 114 the valve body 110 defines a recess 115 for receiving a sealing member (not labeled).

Main reservoir 114 is also in fluid communication with the outlet port 116, also defined by valve body 110. Outlet port 116 extends in a direction parallel to that of inlet port 112 but perpendicular to that of main reservoir 114. As with the inlet port 112, the outlet port 116 may be coupled to external adaptations, fittings or couplings (not show) for easy attachment to a fluid line.

It may be noted that the bleed tube 120 extends into the inlet port 112 of the valve body 110 as opposed to any portion of the main reservoir 114. This is believed to be beneficial in that it allows the bleed tube 120 to receive fluid in an area of relatively stable fluid flow (i.e., the inlet port) as opposed to an area of potentially significant turbulent flow as may occur in main reservoir 114.

As may be noted, in the exemplary valve 100 of FIG. 9, the valve body 110 may be easily machined and formed from a single piece of material. Specifically, all of the tubes, ports, and reservoirs defined by valve body 110 are either parallel or perpendicular to one another such that the valve body 110 can be easily manufactured without expensive and time-consuming manufacturing processes.

In the valve 100 of FIG. 9, a valve seating tube 150 is positioned within the main reservoir 114. The valve seating tube 150 may be formed of a metallic material that is the same as or different from the material used to form valve body 110. Valve seating tube 150 has an outer diameter $D_1$ slightly greater than the inner diameter of the second section 114b of main reservoir and has a length that substantially extends the length of the main reservoir 114. Valve seating tube 150 is positioned within the second section 114b of main reservoir such that the valve seating tube 150 is nested in, and held in place, by a press-fit between the valve seating tube 150 and the second section 114b of the main reservoir. In the illustrated embodiment, a seal 152 also helps position the valve seating tube 150 within the second section 114b of main reservoir. As may be noted, the valve body 110 and the valve seating tube 150 are separately constructed for assembly so that the valve seating tube 150 may be readily inserted into the main valve body 110.

Positioned within the valve seating tube 150 is a movable structure including a flow shaping element 160, an upper retaining member 170, a lower retaining member 180, and a flexible diaphragm 190 sandwiched between the retaining members 170 and 180. The diaphragm 190 is positioned to extend across the main reservoir 114. A sealing member 182 is positioned on the underside of the lower retaining member 180. The upper retaining member 170 contacts the diaphragm 190 on the side of diaphragm 190 opposite main reservoir 114.

Flow shaping element 160 is a solid structure that is fixedly attached to the upper and lower retaining members 170, 180 and the diaphragm 190 such that, as the flexible diaphragm 190 flexes and moves, the flow shaping element 160 will move with the diaphragm 190. The flow shaping element 160 includes a first section extending above the flexible diaphragm 190, which defines a pilot tube 162. Pilot tube 162 feeds into a long, cylindrical discharge passageway 164 that extends the length of the flow shaping element 160. As reflected in the figure, the flow shaping element 160 extends along a significant portion of the valve seating tube 150. In some embodiments, the flow shaping element may extend for a length greater than or equal to 2.5 times the inner diameter $D_2$ of the valve seating tube 150.

Figure 10:
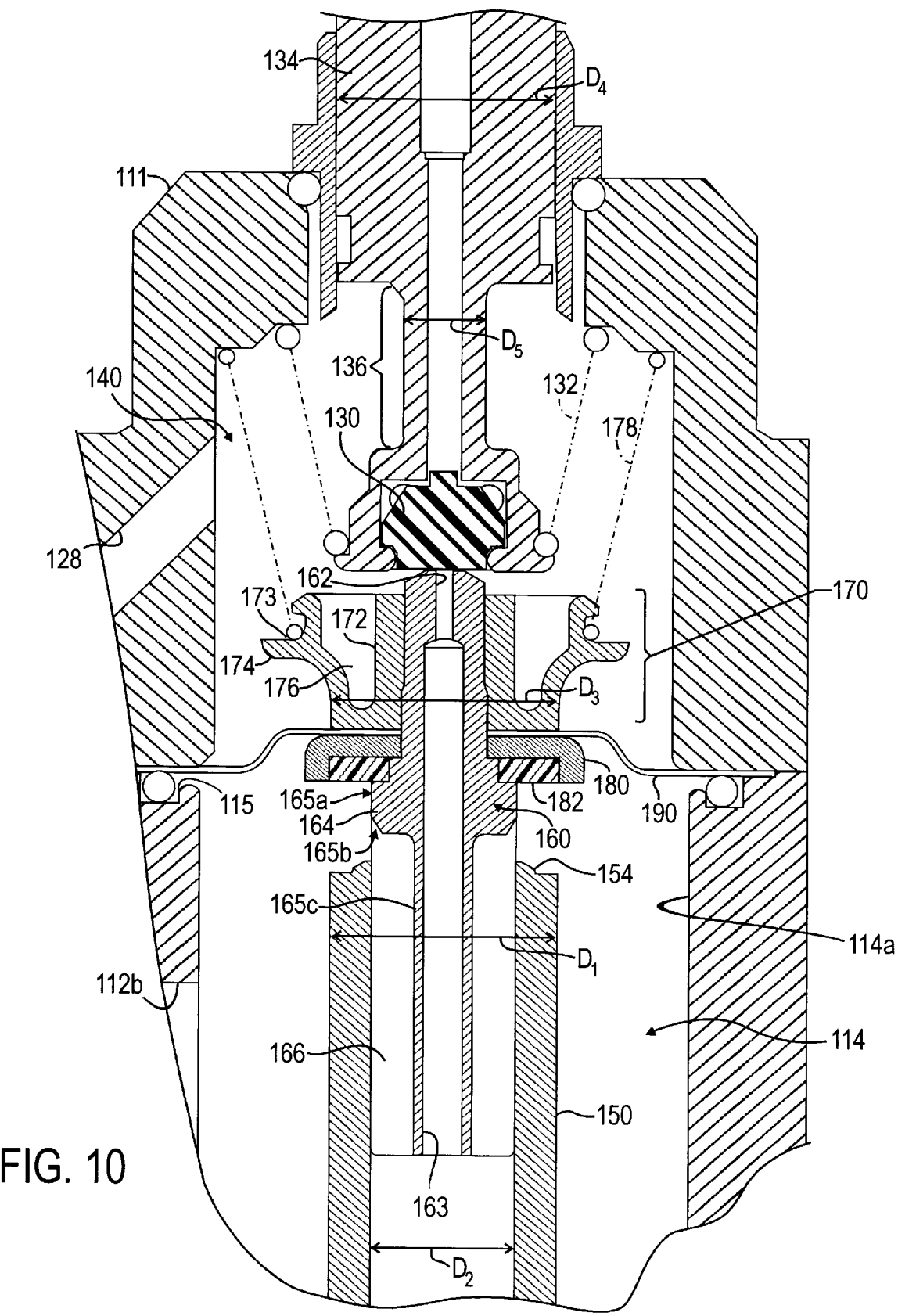
FIG. 10 is a detailed cross sectional view of an illustrative embodiment of the present invention shown in FIG. 9 depicting an open valve.

The flow shaping element 160 includes a second section 164 that has an outer diameter approximately equal to, but slightly less than, the inner diameter $D_2$ of the valve seating tube 150. A more detailed view of this portion of the flow shaping element 150, along with a more detailed view of the upper portion of valve seating tube 150 is provided in FIG. 10. FIG. 10 provides an enhanced view of flow shaping element 160 and valve seating tube 150 from FIG. 9. Referring to FIG. 10, the upper portion of valve seating tube 150 includes a slightly raised portion that defines a valve seat 154. When the flexible diaphragm 190 is in its normal and non-deformed state, the sealing member 182 associated with the movable structure including flow shaping element 160 will rest against the valve seat 154 thus blocking fluid flow over the valve seat 154.

As FIG. 10 reflects, the flow shaping element 160 includes a second section 164 that extends below flexible diaphragm 190. The second section 164 has three parts. A first part 165a has a straight portion that extends in a direction substantially parallel to the walls of the valve seating tube 150. A second part 165b of the flow shaping element 160 tapers inward at a relatively constant slope that, in the illustrated example, is at an 11 degree slope with respect to the walls of the valve seating tube 150. A third part 165c of the flow shaping element 160 consists of an extension of the pilot tube 162 and vanes 166 that extend from the pilot tube 162. Only two such vanes 166 are illustrated in the figures. In addition to enhancing the fluid flow characteristics of valve 100, the vanes 166 help stabilize the flow shaping element 160 and, therefore, the flexible diaphragm 190 attached to the flow shaping element 160.

The specific shape of the flow shaping element 160 is important for providing the flow characteristics that allow the valve 100 of FIGS. 9 and 10 to be utilized in a fluid control system such as described in connection with FIG. 6. Specifically, as the fluid pressure in the main reservoir 114 increases to a point where the flexible diaphragm 190 is deflected upward, the flow shaping element 160 will begin to lift off the valve seat 154 and thus allow fluid to flow over the valve seat 154. Fluid is allowed to flow through a passageway defined by the relationship between the second section 164 of the flow shaping element 160 and the inner walls of the valve seating tube 150. Specifically, when the flow shaping element 160 is initially lifted off the valve seat 154, the change in the amount of fluid that can flow over the valve seat 154 into the valve seating tube 150 will be relatively small in response to upward movement of the flow shaping element 160. This is because the passageway through which the fluid must pass will be defined by the straight section 165a of the flow shaping element 160. Upward movement of the flow shaping element 160 at this position will not appreciably increase the diameter of this passageway. The straight section 165a of the flow shaping element 160 helps provide for the relatively flat, low-slope section A of the curve 214 of FIG. 8. Thus, the specific shape of this portion of flow shaping element 160 helps provide the "high-frequency" flow characteristics that make valve 100 particularly suited for use in a system as illustrated in FIG. 6

As flow shaping element 160 is moved upward in response to deflection of the diaphragm 190, a point will be reached where the tapered section 165b of the flow shaping element 160 begins to define the passageway through which fluid flows over the valve seat 154 into the valve seating tube 150. At this point, the rate of change in fluid flow as a percent of the change in the upward movement will increase significantly beyond what existed when the passageway was defined by only the straight section 165a of flow shaping element 160. Thus, during this region of movement of the flow shaping element 160, the valve 100 will exhibit characteristics reflected by intermediate section B of the curve 214 of FIG. 8. Continued upward movement of the flow shaping element 160 will result in sections 165a and 165b of the flow shaping element 160 projecting above and out of the valve seating tube 150 such that the fluid will flow over the valve seat 154 directly into the tube 150 without significant restriction. In this position as illustrated in FIG. 10, the valve 100 will be in the higher flow section C of the curve 214 in FIG. 8.

In addition to providing a detailed illustration of the flow shaping element 160, FIG. 10 also illustrates the manner in which the flexible diaphragm 190 is positioned between the upper and lower retaining members 170 and 180 and the construction of the members 170 and 180. In the illustrated example, lower retaining member 180 is a generally circular member that is mounted to both the fluid shaping element 160 and the diaphragm 190. Upper retaining member 170, however, has a more complicated structure. Specifically, upper retaining member 170 includes two raised sections 172 and 174 that define an annular recessed region 176. The movable member containing upper retaining member 170 is inhibited from moving upward in an undesired manner by the relationship between a first biasing spring 178 and the upper retaining member 170. Specifically, the upper retaining member 170 defines an annular ledge structure 173 that is sized to receive one end of biasing spring 178. The other end of biasing spring 178 is positioned against a portion of the upper valve body 111, which will be discussed in more detail below. Biasing spring 178 provides a downward biasing force that will tend to bias the upper retaining member 170, and thus all components attached to that member 170 in a fixed fashion (e.g., the diaphragm 190 and the fluid shaping element 160).

As may be noted from FIG. 10, biasing spring 178 is conical in shape and has the special characteristics in that one end of the spring 178 has a diameter that is larger than the end of the spring 178 that is received by the upper retaining member 170. This feature of spring 178 results in the application of an "angled" force to the upper retaining member 170. The force applied to the upper retaining member 170 will have both: (1) a "downward" component that biases the upper retaining member 170 and all elements attached to it in a fixed fashion downward against the valve seat 154 and (2) a "lateral" or "sideways" component that will tend to keep the upper retaining member 170—and the elements affixed to it—from moving in a lateral direction (e.g., left or right in FIG. 10). This double biasing feature of spring 178 further contributes to the special flow characteristics of valve 100.

Because valve 100 will operate in the same general manner as the valve described in connection with FIGS. 1–4, the flow characteristics of the valve 100 will depend, in many respects, on the ability of fluid to flow through the pilot tube 162. The ability of fluid to flow through the pilot tube 162 will depend, in large part, on the volume of an imaginary cylinder that may be visualized as extending up from the pilot tube 162 to a pilot sealing element 130 when the pilot sealing element 130 is lifted off the pilot tube 162. The volume of this imaginary cylinder will depend on a number of parameters including the distance separating the pilot sealing element 130 and the effective cross-sectional area of the pilot tube 162 in the direction of fluid flow. The effective cross-sectional area of the pilot tube 162, will in turn depend on the alignment of the pilot tube 162. Any rocking, lateral-movement, or other movement of the movable structure containing upper retaining member 170 will also affect the effective cross-sectional area of the pilot tube 162. Thus, for accurate, reliable, and repeatable fluid flow, it is important that the potential for change in the effective cross-sectional area of the pilot tube 162 be reduced. This is particularly critical at the low flow rates under which valve 100 may be intended to operate. The utilization of the special, double biasing spring 178 thus, enhances the ability of the valve 100 to provide controllable fluid flow at low flow rates.

A further feature of the upper retaining member 170 is that the outer diameter $D_3$ of the upper retaining member is sized particularly with respect to the diameter $D_1$ of the valve seating tube 150 to control the effective area of flexible diaphragm 190. The effective area of a flexible diaphragm 190 is defined by the diameters of the rigid elements 170 and 180 supporting the diaphragm 190. For example, the effective area of the diaphragm 190 of FIG. 10 would be approximately halfway between the outer diameter of the upper retaining member and the diameter of the O-ring sealing member. in recess 115 that clamps the outside portion of the diaphragm 190. By controlling the diameter $D_3$ of the upper retaining member 170 it is possible to decrease the effective area of flexible diaphragm 190 thus allowing for more effective control of valve 100. In one embodiment of valve 100, the maximum outer diameter $D_3$ of the upper retaining member 170 is sized such that it is less than or equal to the outer diameter $D_1$ of valve sealing tube 150. This relationship between the outer diameter $D_3$ of the upper retaining member 170 and the valve seating tube 150 is believed to provide for particularly beneficial flow control.

As also reflected in FIG. 10, the pilot sealing member 130 is positioned within a movable control element or solenoid core 134. The movable control element 134 corresponds to the element in FIGS. 1–4 that moves in response to energization of the solenoid. The movable control element 134 is biased downward against the pilot tube 162 by a double-biasing spring 132 that operates in a manner similar to that described above in connection with spring 178. Because unwanted lateral or other movements of the pilot sealing member 130 may also affect flow through pilot tube 162, the use of the double biasing spring 132 with respect to this element 134 also enhances the ability of valve 100 to provide accurate, controllable flow at low flow levels.

A further feature of the valve 100 illustrated in FIG. 10 is the unique construction of the movable control element 134 (or solenoid core). In particular, it may be noted that the movable control element 134 has been machined such that material has been removed in the area of element 134 adjacent the pilot sealing member 130. This machining results in a narrowed portion 136 of the movable control element 134 near the location where the element 134 is coupled to the pilot sealing member 130. The movable control element or solenoid core 134, which is typically cylindrical in chape, has a maximum outer diameter of $D_4$. The narrowed portion 136 has an outer diameter $D_5$ less than the maximum outer diameter $D_4$. This machining of the movable control element 134 to form the narrowed portion 136 reduces the mass of the movable control element 134 such that the natural frequency of the mechanical system formed by the movable control element 134 and its biasing spring 132 is increased. The increase in the natural frequency of the system tends to separate the natural frequency of the mechanical system described above from: (1) the frequencies used for the fixed frequency PWM and (2) from the frequencies that will be established when fluid is flowing through valve 100. This separation of frequencies will tend to reduce unwanted valve vibration and result in enhanced control of fluid flow. The machining of the movable control element 134 (or solenoid core) is believed to be a significant departure from conventional valve constructions in which the solenoid core is retained as an essentially uniform cylindrical member. In accordance with one construction of the valve 100, as much as 28% of the weight of the original solenoid core is removed to form the narrowed portion 136 of the movable control element 134.

Referring back to FIG. 9, in addition to the elements described above, valve 100 includes an upper valve body 111 that may be formed of the same material as main valve body 110. Upper valve body 111 may be formed of a single piece of material that defines an angular passageway 128. When upper body 111 is positioned over main valve body 110, the angular passageway 128 is in fluid communication with reservoir 122 so that fluid can flow from the inlet port 112, through bleed tube 120 and reservoir 122 into passageway 128. Passageway 128 is in fluid communication with an upper reservoir 140 with passageway 128 defining an opening at its upper position. When the valve 100 is assembled, the upper retaining member 170 is positioned in this reservoir 140 and the pilot tube 162 opens into this reservoir 140.

As discussed above, the relationships between the cross sectional areas of the pilot tube 162 (or pilot orifice) and the bleed tube 120 (or effective bleed area) and the spring constant of the spring 178 that biases the diaphragm 190 may be of significant importance in achieving a usable range of flow control for any given frequency and duty cycle pulse.

The sizing of the orifice of the pilot tube 162 is important in ensuring that the low-frequency mode (e.g., 31 Hz) and high-frequency mode (e.g., 160 Hz) flow vs. PWM duty cycle curves include an appropriate region of overlap, allowing for a clean transition point. If the orifice of the pilot tube 162 is too large, the minimum flow obtainable in the high frequency mode may be compromised, and may exceed the maximum controllable flow in the low frequency mode. If the orifice of the pilot tube 162 is too small, the upper end of the low frequency mode curve may be limited, again resulting in high and low frequency mode curves that do not overlap.

The effective bleed area of the bleed tube 120 of the valve of the type discussed herein is used to balance the pressures and forces above and below the diaphragm 190. This effective bleed area is typically smaller than the area of the orifice of the pilot tube 162. Opening of the orifice of the pilot tube 162 causes a pressure/force imbalance across the diaphragm 190, causing the main valve to open. Inversely, closing of the orifice of the pilot tube 162 causes the diaphragm 190 to be pressure/force balanced, allowing it to be closed by some mechanical means. The sizing of the effective bleed area in relation to the other parameters can be of significance in that if the effective bleed area is too small, pressure will be dumped through the orifice of the pilot tube 162, during the active portion of a low-frequency PWM pulse faster than it can be replaced by the bleed tube 120. This could cause the diaphragm 190 to lift and open the main valve prematurely, thus limiting the potential low flow range. An effective bleed area sized too large, while maximizing the amount of flow that could be obtained in the low frequency mode, could result in an inability for the diaphragm 190 to unbalance and prevent the main valve from opening for higher flows. In addition, it has been found that effective bleed areas too large may result in greater separation of the pilot sealing member 130 and the pilot tube 162, resulting in valve instability With respect to the diaphragm biasing spring 178, if this spring 178 is too weak, the diaphragm 190 may open prematurely during low frequency mode, limiting the controllable flow range. If the spring 178 is too strong, the upper end of the high frequency curve may be limited, reducing the turn down ratio.

It should be noted that no single parameter, duty cycle, frequency, pilot area, effective bleed area, or diaphragm biasing spring governs successful operation of the valve in the low or high frequency mode. Rather, it is a balance of all parameters.

As may be noted, upper body 111, because of its elegant design, may be easily constructed and affixed to main valve body 110. Thus, the construction of the main valve body 110, the valve seating tube 150 and the upper body 111 allow for relatively easy, cost-effective, "bottom" up construction of the valve 100.

Attached to the upper opening of reservoir 140 is an actuating assembly that includes the movable control element 134 discussed above, and the magnetic and other materials forming the solenoid that causes the movable control element 134 to move in response to an energizing signal. The construction and operation of this portion of valve 100 is the same as that previously discussed with respect the valve of FIGS. 1–4 and will not be further discussed herein.

The general operation of valve 100 is the same as that described above in connection with the valve of FIGS. 1–4. Thus, when the valve is providing a low fluid flow, it is operating in response to a controller providing low-frequency PWM control signals. Fluid flow will occur as a result of fluid flowing into the inlet port 112, through the bleed tube 120 and into reservoir 140. As a result of upward movement of the movable control element 134 during each PWM period, fluid will flow through the pilot tube 162, through the discharge passageway 163 and out the outlet port 116. As the active duty cycle of the PWM control is increased in this low frequency mode, more and more fluid will flow through valve 100 during each PWM period and a point may be reached where the diaphragm 190 is deflected slightly upward and fluid flows over valve seat 154 into valve seating tube 150 and out the outlet port 116. While the vast majority of the fluid flow in the low frequency mode of operation will be through the bleed and pilot tubes 120 and 162, the above is mentioned to indicated that some fluid flow over the valve seat 154 is not inconsistent with the teachings provided herein.

When a point is reached that the controller controlling valve 100 switches to a high frequency mode of control, the movable control element 134 will move up in a controlled manner until a point is reached where the valve 100 is fully opened.

While the apparatus and methods of this invention have been described in terms of preferred embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is as follows:

1. A proportional valve comprising:
    a main valve body defining an inlet port, an outlet port, and a main reservoir;
    a valve seating tube positioned within the main reservoir and having a first outer diameter;
    a pilot tube member positioned within the valve seating tube and having a flexible diaphragm positioned across a dimension of the main reservoir; and
    an upper member securing the pilot tube member to the diaphragm on a side opposite the valve seating tube and having a second outer diameter, the second outer diameter being in contact with the diaphragm and being less than or equal to the first outer diameter of the valve seating tube,
    wherein the flexible diaphragm has a first effective area on the side opposite the valve seating tube defined by the second outer diameter and the dimension of the main reservoir.

2. The proportional valve of claim 1, further comprising a first double biasing spring disposed in the main reservoir and biasing the diaphragm on the side opposite the valve seating tube.

3. The proportional valve of claim 1, further comprising a second double biasing spring disposed in the main reservoir and biasing a pilot valve member movable in relation to the pilot tube member.

4. The proportional valve of claim 1, wherein the body defines a bleed tube communicating the inlet port with the main reservoir on the side of the diaphragm opposite the valve seating tube.

5. The proportional valve of claim 4, wherein a portion of the bleed tube adjacent the inlet port is perpendicular to the inlet port.

6. The proportional valve of claim 1, further comprising:
   a lower member retaining the pilot tube member to the diaphragm on a side adjacent the valve seating tube and having a third outer diameter, the third outer diameter being in contact with the diaphragm and being at least as great as the first outer diameter of the valve seating tube,
   wherein the flexible diaphragm has a second effective area on the side adjacent the valve seating tube defined by the third outer diameter and the dimension of the main reservoir.

7. The proportional valve of claim 6, wherein the first effective area is greater than the second effective area.

8. A proportional valve having an extended flow range, comprising:
   a body having an inlet and an outlet with a reservoir between the two;
   a main flow area in the reservoir having an inner wall with an inner dimension; and
   a pressure sensitive member comprising a diaphragm positioned within the reservoir, and a pilot tube member secured to the diaphragm; the pilot tube member having a first portion on a first side of the diaphragm and a second portion on a second side of the diaphragm; the second portion of the pilot tube member having an outer flow shaping surface comprised of:
      a first section adjacent the diaphragm and extending substantially parallel to the inner wall of the main flow area, the first section having a first outer dimension less than the inner dimension of the main flow area and adapted to present a restricted flow region through the main flow area when the diaphragm is moved to a low flow condition,
      a second section adjacent the first section and tapering away from the inner wall of the main flow area, the second section adapted to present a less restricted flow region through the main flow area when the diaphragm is moved to an intermediate flow condition, and
      a third section adjacent the second section and having a third outer dimension less than the first outer dimension of the first section, the third section adapted to present a full flow region through the main flow area when the diaphragm is moved to a high flow condition.

9. The proportional valve of claim 8, wherein the second portion of the pilot tube member is disposable in the main valve area for a length greater than or equal to 2.5 times the inner dimension of the main valve area.

10. The proportional valve of claim 8, wherein the second section tapers inward from the first section to the third section at an 11 degree slope with respect to the inner wall of the main valve area.

11. The proportional valve of claim 8, further comprising a first double biasing member disposed in the reservoir and biasing the pressure sensitive member on the first side opposite the main valve area.

12. The proportional valve of claim 8, further comprising a second double biasing spring disposed in the reservoir and biasing a pilot valve member movable in relation to the pilot tube member.

13. The proportional valve of claim 8, wherein the body defines a bleed tube communicating the inlet with the reservoir on the first side of the diaphragm opposite the main valve area.

14. The proportional valve of claim 13, wherein a portion of the bleed tube adjacent the inlet is perpendicular to the inlet.

* * * * *